US012595640B2

(12) United States Patent
Glöckner et al.

(10) Patent No.: US 12,595,640 B2
(45) Date of Patent: Apr. 7, 2026

(54) METHOD FOR OPERATING AN ELECTRIC DRIVETRAIN FOR A WORKING MACHINE, ELECTRIC DRIVETRAIN FOR A WORKING MACHINE, AND WORKING MACHINE

(71) Applicant: ZF Friedrichshafen AG, Friedrichshafen (DE)

(72) Inventors: Rico Glöckner, Pocking (DE); Raphael Zohner, Huenfelden (DE); Migen Bebeti, Munich (DE); Stephan Schinacher, Egesheim (DE); Stefan Traub, Friedrichshafen (DE); Andreas Rothmund, Hohentengen (DE); Jürgen Legner, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 419 days.

(21) Appl. No.: 18/001,476

(22) PCT Filed: Jun. 14, 2021

(86) PCT No.: PCT/EP2021/065983
§ 371 (c)(1),
(2) Date: Mar. 17, 2023

(87) PCT Pub. No.: WO2021/254968
PCT Pub. Date: Dec. 23, 2021

(65) Prior Publication Data
US 2023/0212838 A1 Jul. 6, 2023

(30) Foreign Application Priority Data
Jun. 16, 2020 (DE) ..................... 10 2020 207 422.4

(51) Int. Cl.
*E02F 9/20* (2006.01)
*B60L 15/20* (2006.01)
(Continued)

(52) U.S. Cl.
CPC .......... *E02F 9/207* (2013.01); *B60L 15/2009* (2013.01); *E02F 9/2079* (2013.01);
(Continued)

(58) Field of Classification Search
CPC ..... E02F 9/207; E02F 9/2079; B60L 15/2009; Y02T 10/64; Y02T 10/72
See application file for complete search history.

(56) References Cited

U.S. PATENT DOCUMENTS

2006/0025917 A1 2/2006 Pandey et al.
2007/0046099 A1* 3/2007 Matsuura ............ B60T 8/17616
303/152

(Continued)

FOREIGN PATENT DOCUMENTS

DE 202014000738 U1 3/2014
EP 0962597 A2 12/1999
(Continued)

*Primary Examiner* — Abby J Flynn
*Assistant Examiner* — Clint Pham
(74) *Attorney, Agent, or Firm* — LEYDIG, VOIT & MAYER, LTD.

(57) ABSTRACT
A method for operating an electric drivetrain of a working machine is provided wherein the drivetrain comprises a work drive with an electric work motor and a travel drive with an electric travel motor and vehicle wheels, wherein the working machine experiences a speed deceleration from the outside that may result in a braking force acting on the vehicle wheels lower than a driving force acting on the vehicle wheels due to a moment of inertia of the travel motor. The method includes supplying the travel motor with a power in a direction opposite to an operating direction of the travel motor in order to reduce a rotational speed of the travel motor, if it is detected in advance using a situation detection that the braking force acting on the vehicle wheels
(Continued)

as a result of the speed deceleration is lower than the driving force acting on the vehicle wheels.

16 Claims, 2 Drawing Sheets

(51) Int. Cl.
    *E02F 3/28*           (2006.01)
    *E02F 9/26*           (2006.01)

(52) U.S. Cl.
    CPC .............. *E02F 9/2083* (2013.01); *E02F 9/26* (2013.01); *B60L 2200/40* (2013.01); *B60L 2240/12* (2013.01); *B60L 2240/16* (2013.01); *B60L 2240/421* (2013.01); *B60L 2240/423* (2013.01); *B60L 2240/427* (2013.01); *B60L 2240/50* (2013.01); *B60L 2240/66* (2013.01); *B60L 2250/00* (2013.01); *E02F 3/283* (2013.01)

(56) References Cited

U.S. PATENT DOCUMENTS

| 2009/0265065 | A1 | 10/2009 | Ikari | |
| 2011/0130937 | A1* | 6/2011 | Krueger | B60W 10/08 |
| | | | | 303/152 |
| 2015/0217643 | A1* | 8/2015 | Lee | B60L 7/10 |
| | | | | 701/22 |
| 2015/0246612 | A1 | 9/2015 | Velde et al. | |
| 2016/0059703 | A1* | 3/2016 | Miller | B60W 30/18127 |
| | | | | 701/22 |
| 2017/0002546 | A1 | 1/2017 | Fletcher et al. | |
| 2018/0229610 | A1* | 8/2018 | Lian | B60T 7/042 |
| 2019/0111790 | A1* | 4/2019 | Crombez | B60T 8/268 |
| 2021/0276428 | A1 | 9/2021 | Feuchtner | |
| 2021/0347265 | A1* | 11/2021 | Park | B60T 1/10 |

FOREIGN PATENT DOCUMENTS

| EP | 2937467 A1 | 10/2015 |
| WO | WO 2020007751 A1 | 1/2020 |

* cited by examiner

METHOD FOR OPERATING AN ELECTRIC DRIVETRAIN FOR A WORKING MACHINE, ELECTRIC DRIVETRAIN FOR A WORKING MACHINE, AND WORKING MACHINE

CROSS REFERENCE TO RELATED APPLICATIONS

This application is a U.S. National Phase application under 35 U.S.C. § 371 of International Application No. PCT/EP2021/065983, filed on Jun. 14, 2021, and claims benefit to German Patent Application No. DE 10 2020 207 422.4, filed on Jun. 16, 2020. The International Application was published in German on Dec. 23, 2021 as WO 2021/254968 A1 under PCT Article 21(2).

FIELD

The present invention relates to a method for operating an electric drivetrain of a working machine and a corresponding working machine.

BACKGROUND

In the prior art, electrically driven working machines are known, such as wheel loaders, skid-steer loaders, telescopic loaders, dumpers or also excavators. These electrically driven working machines are either purely electrically driven, i.e. they exclusively have an electric battery for their energy supply, or they are diesel-electrically driven, which means that the required energy is provided by a diesel-driven generator, usually in connection with an electric buffer storage, such as an appropriately dimensioned capacitor. In all cases, the mechanical power required for the travel drive and the work drive is provided by one or more electric motors. Furthermore hybrid electric machines are known in which the mechanical power required for operation is provided primarily by an internal combustion engine, usually a diesel engine. An additionally provided electric motor is supplied by a battery and in this case typically performs a so-called boost function.

In this context, DE 20 2014 000 738 U1 describes a wheel loader, driven purely electromotively, which has a first electric motor for a travel drive and a second electric motor for a work drive.

EP 0 962 597 A2 describes a battery-powered working machine that has two electric motors for the travel drive and a further electric motor for the work drive.

However, the known electrically driven machines have the disadvantage that, due to the electric motors used for the drive, they exhibit a comparatively high inertia in the drivetrain when decelerating the machine, i.e. when reducing the speed of the electric motor, especially if braking is to be effected via recuperation operation of the electric motor or a mechanical friction brake. The reason for this behavior lies in the comparatively very high speeds of an electric motor in conjunction with its high mass inertia. An electric motor rotating under full load therefore has a significantly greater rotational energy than a correspondingly configured powerful internal combustion engine under full load. In the case of an electrically driven wheel loader, for example, this can result in the wheel loader being decelerated via the bucket, when the bucket plunges into a pile of earth or similar from medium or high speed without the wheels being able to transmit a corresponding deceleration to the electric motor. As a result, the wheels spin in this situation, causing undesirable digging-in of the wheel loader.

SUMMARY

In an embodiment, the present disclosure provides a method for operating an electric drivetrain of a working machine wherein the drivetrain comprises a work drive with an electric work motor and a travel drive with an electric travel motor and vehicle wheels, and wherein the working machine experiences a speed deceleration from the outside that may result in a braking force acting on the vehicle wheels lower than a driving force acting on the vehicle wheels due to a moment of inertia of the travel motor. The method includes supplying the travel motor with a power in a direction opposite to an operating direction of the travel motor in order to reduce a rotational speed of the travel motor, if it is detected in advance using a situation detection that the braking force acting on the vehicle wheels as a result of the speed deceleration is lower than the driving force acting on the vehicle wheels.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
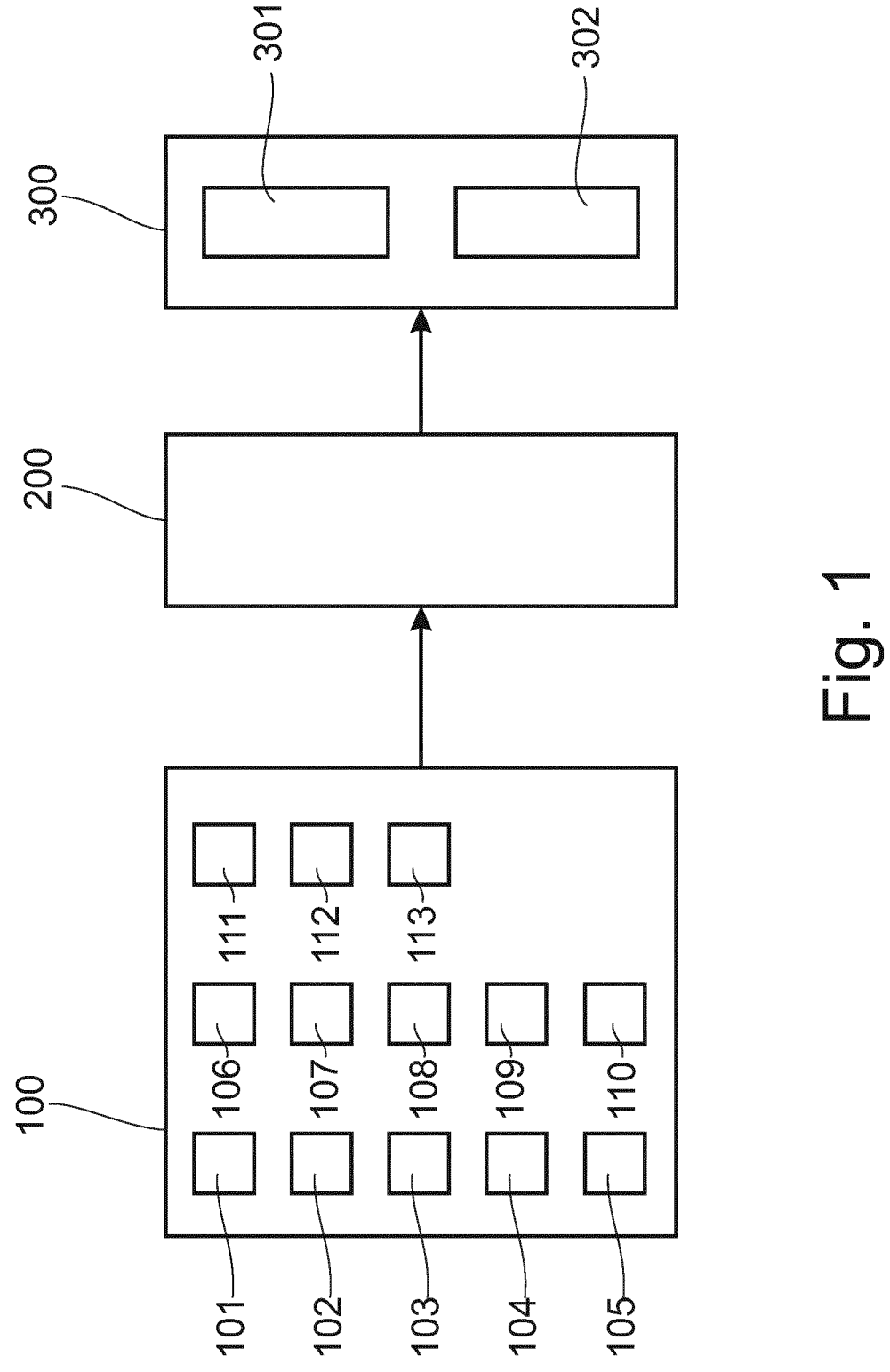
FIG. 1 in the form of a functional diagram, an example of a possible embodiment of a method according to the invention for operating an electric drivetrain of a working machine, and FIG. 2 exemplary and schematically, a possible configuration of a working machine according to the invention.

It is an object of the invention to propose an improved method for operating an electric drivetrain of a working machine.

According to the invention, this object is achieved by the method for operating an electric drivetrain of a working machine. Advantageous embodiments and further configurations of the invention are apparent from the dependent claims.

The invention relates to a method for operating an electric drivetrain of a working machine, wherein the drivetrain comprises a working drive with an electric work motor and a travel drive with an electric travel motor and vehicle wheels, wherein the working machine experiences a speed deceleration from the outside and wherein a braking force acting on the vehicle wheels due to the speed deceleration can be lower than a driving force acting on the vehicle wheels due to a moment of inertia of the travel motor. The method according to the invention is characterized in that the travel motor is supplied with a power opposite to its operating direction in order to reduce the speed, if it is detected in advance by means of a situation detection that the braking force acting on the vehicle wheels as a result of the speed deceleration is lower than the driving force acting on the vehicle wheels.

The invention thus describes a method that relates to the operation of an electric drivetrain of a working machine, wherein the drivetrain comprises at least two drives, which can be operated independently of one another, namely the working drive and the travel drive. It is conceivable and preferred that the drivetrain also comprises further elements or further drives, for example auxiliary outputs or auxiliary drives. In particular, the drivetrain also comprises an electric energy storage unit, which is preferably designed as a rechargeable electric battery. Both the work drive and the travel drive advantageously each comprise one or more electric motors, which, according to their assignment, are used as travel motors or work motors. In addition, they can comprise transmissions and/or transmission stages, output drives, hydraulic components, control electronics and power electronics. Particularly advantageously, the electric motors are identical in design for the travel drive and for the work drive. This makes it possible to achieve cost-reducing effects on the number of parts required for the electric motors. The travel drive also includes vehicle wheels that are driven by the travel motor and are rigidly drivably connected to the travel motor or can be rigidly drivably connected via a coupling. Similarly, the work drive comprises a work device, such as a bucket or a lift mast, driven by the work motor.

In certain operating situations, the case may arise, in which the work machine experiences a speed deceleration from the outside. For the purposes of the invention, this is to be understood as a speed deceleration that has not been initiated by either the vehicle brakes or the travel drive. Instead, the speed deceleration occurs due to the interaction of the working machine with an external condition. For example, there may be a steep hill climb or a penetration of earth or rubble by a work device of the working machine. Both lead to the working machine experiencing a deceleration in speed from the outside without any action on its own part and in particular without any braking request from an operator of the working machine.

In particular, if the working machine initially has a comparatively high speed when experiencing the speed deceleration and the travel motor thus has a comparatively high rotational speed, it can happen that the braking force acting on the travel motor via the vehicle wheels is lower than the driving force acting on the vehicle wheels due to a moment of inertia of the travel motor. Since the travel motor is configured as an electric motor, it has a comparatively large moment of inertia, which counteracts a reduction in speed during deceleration. Due to this moment of inertia and the speed of the electric motor, a driving force continues to act on the vehicle wheels, even when the travel motor is not further energized. The braking force acting on the vehicle wheels as a result of the deceleration is largely determined by the power transmission capability of the vehicle wheels to the ground, i.e. by the adhesive force of the vehicle wheels on the respective ground. If the driving force is now greater than the braking force also acting on the vehicle wheels, the vehicle wheels lose their grip and spin. In other words, the vehicle wheels cannot reduce their rotational speed to the same extent as the working machine reduces its speed. This can lead to undesirable digging-in of the working machine into the ground.

For example, it can happen that a working machine configured as a wheel loader drives a work device configured as a bucket into an earth pile at a comparatively high speed and experiences a speed deceleration due to the driving of the bucket into the earth pile. The comparatively high speed is necessary to drive the bucket as far as possible into the pile of earth. However, the grip of the vehicle wheels may not be great enough to reduce the rotational speed of the travel motor to the same extent as the speed of the working machine is reduced. Thus, the driving force acting on the vehicle wheels is greater than the braking force acting on the vehicle wheels and the latter spin, causing the wheel loader to be buried and making it difficult to reverse the wheel loader when driving the bucket out of the earth pile.

According to the invention, it is therefore provided that a situation detection is carried out by means of which it can be recognized in advance whether an externally acting speed deceleration is imminent or has possibly already set in and whether the resulting braking force acting on the vehicle wheels will be lower than the driving force acting on the vehicle wheels due to the moment of inertia of the driving motor continuing to rotate. The situation detection can, for example, anticipate that such a situation exists by setting a speed deceleration of the working machine without the presence of a corresponding control input by the operator of the working machine. In order to now advantageously avoid a spinning of the vehicle wheels and thus an undesired digging-in of the working machine, the travel motor is energized according to the invention against its current operating direction in order to provide an additional braking torque acting on the travel motor.

According to a preferred embodiment of the invention, it is provided that the situation detection is performed by means of an environment sensor system. Suitable environment sensors can in particular be camera sensors, radar sensors and/or lidar sensors. For example, the environment sensor system, in particular in conjunction with a suitable sensor data evaluation, enables the detection of situations in which the working machine experiences a speed deceleration from the outside. For example, it can be detected that a wheel loader is approaching a rubble pile in order to drive its bucket into the rubble pile. When the rubble pile is reached, and thus when the speed deceleration starts, the speed of the travel motor can be actively reduced by supplying power in the opposite direction to the direction of rotation of the travel motor.

According to a further preferred embodiment of the invention, it is provided that the situation detection is carried out by means of an acceleration sensor system and/or a tilt sensor system. By means of the acceleration sensor system, it can be detected, for example, that the working machine experiences a speed deceleration without a corresponding control input from an operator of the working machine, and therefore it must be a speed deceleration from outside. The tilt sensor system can support the situation detection by means of the acceleration sensor system, e.g. by detecting a steep incline as the cause of the speed deceleration from outside or a rising of the working machine at the rear axle as a result of a bucket driving into a pile of earth.

According to a further preferred embodiment of the invention, it is provided that the situation be detected by means of a slipping clutch, wherein a clutch pressure is predetermined in such a way that a torque transmissible by the clutch is lower than a braking torque resulting from the braking force. The braking torque at the vehicle wheels is thereby the maximum possible braking torque resulting from a grip of the vehicle wheels on the ground. Thus, in the event of a slipping clutch, it can be detected that a driving force continues to act on the vehicle wheels braked from the outside.

The clutch pressure is thereby preferably set in such a way that normal operation of the working machine is not impaired. Particularly preferably, the clutch pressure can also be lowered only after starting of the working machine to such an extent that a torque that can be transmitted by the clutch is lower than the maximum braking torque on the vehicle wheels, which results from an externally acting speed deceleration due to a grip of the vehicle wheels on the ground.

According to a further preferred embodiment of the invention, it is provided that the situation detection is performed by means of a speed monitoring and/or torque monitoring of the travel drive. For example, in the event of a reduction in the rotational speed in the travel drive and a simultaneous increase in the torque in the travel drive, in particular in the absence of a corresponding control input from the operator, the presence of an externally acting speed deceleration can be detected. If the torque simultaneously exceeds a pre-settable threshold value, the travel motor can be actively energized in the opposite direction to its direction of rotation to prevent the vehicle wheels from spinning.

Particularly preferably, the situation detection is also carried out by a monitoring of a speed gradient and/or a torque gradient in the travel drive.

Also especially preferred, the situation detection is carried out by a monitoring of a slip of the vehicle wheels. In the event of a sudden increase in slip at all vehicle wheels, in particular in combination with one or more of the afore-mentioned preferred embodiments of situation detection, it can also be detected, for example, that the braking force acting on the vehicle wheels as a result of the speed deceleration is less than the driving force acting on the vehicle wheels. The slip of the vehicle wheels is preferably determined by means of the ABS sensors that are present anyway.

According to a further preferred embodiment of the invention, it is provided that the situation be detected by means of absolute speed monitoring. The absolute speed monitoring is a monitoring of the so-called "speed over ground" monitoring. If the detected absolute speed decreases more than a speed of the working machine deter-mined via the wheel speed, it can be detected also in this case that the braking force acting on the vehicle wheels due to the speed deceleration is lower than the driving force acting on the vehicle wheels.

According to another preferred embodiment of the invention, it is provided that the situation detection be carried out by means of monitoring a power demand of the travel drive. For example, the retrieval of a maximum power of the travel motor by the operator, i.e. a so-called "kickdown", in particular in conjunction with a speed deceleration of the working machine that follows shortly thereafter, can indicate that the operator wanted to gain sufficient momentum through the kickdown and requires a high torque, for example to drive a bucket of a wheel loader as deeply as possible into a pile of earth. The speed deceleration that starts shortly thereafter signals that the earth pile has been reached and the bucket has been driven in.

According to a further preferred embodiment of the invention, it is provided that the situation detection be carried out by means of monitoring a behavior of the work drive. The behavior of the work drive can equally comprise a pressure change in a hydraulic work system as well as an alignment or positioning of a bucket on a bucket arm, a position of a lift mast or simply a control input of the operator, e.g. on a control element assigned to the work drive, for example a joystick.

According to a further preferred embodiment of the invention, it is provided that the situation detection be carried out by means of a monitoring of a driving behavior of an operator of the working machine, wherein the driving behavior of the operator of the working machine at an imminent speed deceleration is learned beforehand. Thus, it is advantageously recognized by observing a driving behav-ior of the operator as well as by assigning whether a certain driving behavior of the operator is typically followed by a speed deceleration from outside, whether a speed decelera-tion acting from outside is imminent.

The driving behavior can include, for example, accelera-tion curves, speed curves, control inputs or steering angles.

Particularly preferably, the driving behavior is not learned for just one operator, but a number of different operators of the working machine are distinguished on the basis of their different driving behaviors and a situation detection is carried out for each of them by monitoring the driving behavior. Different operators can also be distinguished, for example, on the basis of their weight when they sit on a driver's seat of the work machine. For this purpose, a weight detection device can be integrated in the driver's seat.

Preferably, the situation detection is also carried out by monitoring an engaged gear step engaged of a travel trans-mission, a differential lock status, a temperature of the travel motor or the work motor, as well as GPS position informa-tion. The gear step can thereby be recorded as part of the driving behavior, for example, as can the differential lock and the temperatures of the travel motor or the work motor. The GPS position information can be used, for example, to detect the approach of the working machine to a pile of earth, the GPS position of which is known.

According to another preferred embodiment of the inven-tion, it is provided that the speed reduction of the travel motor is assisted by performing a gear downshift. A gear downshift changes the speed ratio between the travel motor and the vehicle wheels so that an identical speed of the vehicle wheels now corresponds to a higher rotational speed of the travel motor, or an identical rotational speed of the travel motor corresponds to a reduced speed of the vehicle wheels. Thus, an undesired digging-in of the working machine can be slowed down at least by the reduced speed of the vehicle wheels until the speed of the travel motor can be reduced by energizing it against its current direction of rotation to such an extent that the vehicle wheels no longer spin.

The invention further relates to an electric drivetrain for a working machine, the drivetrain comprising a work drive with an electric work motor and a travel drive with an electric travel motor and vehicle wheels, wherein the vehicle wheels are rigidly drivably coupled or can be rigidly driv-ably couplable to the travel motor so that, in the event of a speed deceleration acting externally on the working machine, there is a braking force acting on the vehicle wheels as a result of the speed deceleration. The drivetrain according to the invention is characterized in that the drivetrain is configured to detect in advance by means of situation detection whether the braking force acting on the vehicle wheels as a result of the speed deceleration is less than a driving force acting on the vehicle wheels as a result of a moment of inertia of the travel motor, the travel drive being configured to supply a power opposite to its operating direction to the travel motor in order to reduce the speed when it is detected that the braking force is less than the driving force.

The drivetrain according to the invention thus enables the method according to the invention to be carried out, which leads to the advantages already described in connection with the method according to the invention.

Preferably, it is provided that the drivetrain further com-prises an inverter for controlling the travel motor. The inverter is advantageously configured to carry out not only the actual control of the travel motor but also the method according to the invention in the form of an electronically executable software algorithm. This results in the advantage of a comparatively very high control speed, since the inverter directly controls the travel motor.

The invention further relates to a working machine comprising a drivetrain according to the invention. This results in the advantages already described in connection with the drivetrain according to the invention also for the working machine according to the invention.

According to a preferred embodiment of the invention, it is provided that the working machine is configured as a wheel loader.

The invention is explained below by way of example with reference to embodiments shown in the figures.

Identical objects, functional units and comparable components are designated with the same reference numerals across all figures. These objects, functional units and comparable components are identical with regard to their technical features, unless the description explicitly or implicitly states otherwise.

FIG. 1 shows an example of a possible embodiment of a method according to the invention for operating an electric drivetrain 11 of a working machine 10 in the form of a functional diagram. The drivetrain 11 comprises a work drive 20 with an electric work motor 21 and a travel drive 30 with an electric travel motor 31 and vehicle wheels 32. If the working machine 10 experiences a speed deceleration from outside, it may happen that a braking force acting on the vehicle wheels 32 due to the speed deceleration is lower than a driving force acting on the vehicle wheels 32 due to a moment of inertia of the travel motor 31. As a result, in such a situation, the vehicle wheels 32 may have a rotational speed corresponding to a speed greater than the actual speed of the working machine 10. The vehicle wheels 32 thus spin, which leads to an undesirable digging-in of the working machine 10. To avoid this, a situation detection according to the invention is first performed, which is illustrated by function block 100. Function block 100 thereby comprises a series of sub-blocks 101-113, each of which describes a specific type of situation detection. In block 101, the situation detection is performed by means of a rotational speed monitoring of a driven axle of the working machine 10. Block 102 stands for the situation detection by means of a monitoring of a tire slip of the driven vehicle wheels 32. Block 103 describes the situation detection by means of a monitoring of an applied steering angle and block 104 by means of a monitoring of a hydraulic pressure in the work drive 20. Block 105 stands for the situation detection by means of the environment sensor system 12, for example by means of a camera sensor, and block 106 stands for the situation detection by means of acceleration sensors. Block 107 stands for situation detection by means of monitoring an output speed of a travel transmission 33 of the travel drive 30, and block 108 stands for situation detection by means of monitoring an engaged gear step of the travel transmission 33. Block 109 in turn describes situation detection by means of monitoring a differential lock of a driven axle. Blocks 110, 111 and 112 describe the situation detection by means of monitoring the actuation of an input means for the work drive 20, a position of a bucket of the work drive 20 and an adjustment angle of a hydraulic pump of the work drive 20. Finally, in block 113, the situation detection is performed by means of monitoring the travel motor 31 and the work motor 21, in particular temperatures, speeds, torques, speed gradients and torque gradients. In function block 200, the situation detections recorded in function block 100 are automatically evaluated to determine in advance whether a situation is imminent in which the braking force acting on the vehicle wheels 32 as a result of the speed deceleration is less than the driving force acting on the vehicle wheels 32 and thus whether a spinning of the vehicle wheels 32 is caused due to the external speed deceleration. If this is detected in advance, the rotational speed of the travel motor 31 is actively reduced in function block 300. For this purpose, in sub-block 301 the travel motor 31 is supplied with a power in the opposite direction to its operating direction to reduce the rotational speed. In addition, a gear downshift is performed in block 302 to support the rapid rotational speed reduction of travel motor 31.

Figure 2:
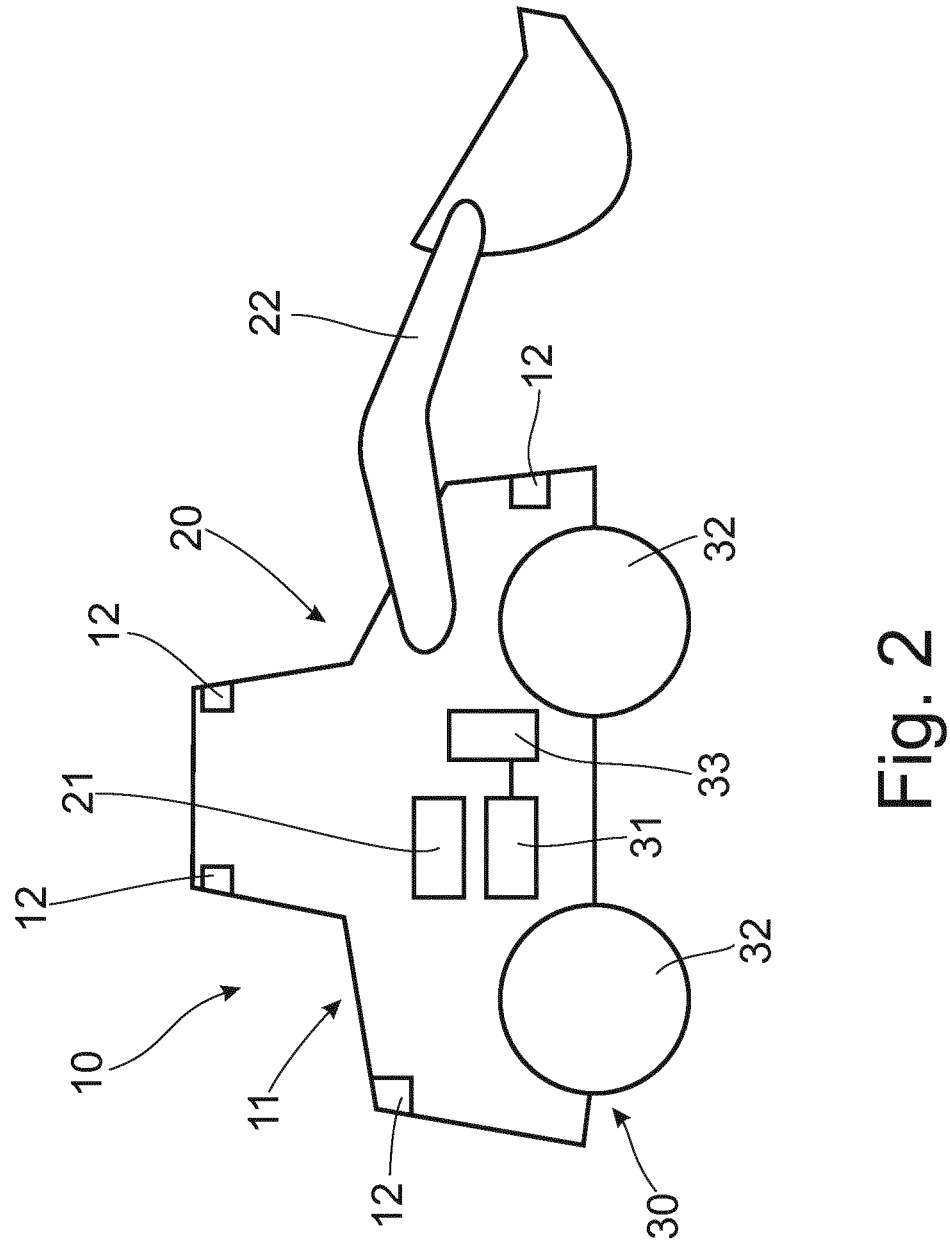

FIG. 2 shows, exemplary and schematically, a possible configuration of a working machine 10 according to the invention. The working machine 10 is exemplarily configured as a wheel loader 10 and comprises an electric drivetrain 11. The electric drivetrain 11 in turn comprises a work drive 20 with an electric work motor 21 and a work device 22, and a travel drive 30 with an electric travel motor 31 and driven vehicle wheels 32. The vehicle wheels 32 are rigidly drivably couplable to the travel motor 31 by means of a travel transmission 33 so that, in the event of a speed deceleration acting externally on the wheel loader 10, there is a braking force acting on the travel motor 31 as a result of the speed deceleration. However, this braking force is counteracted by a driving force generated by a moment of inertia of the travel motor 31 and acting on the vehicle wheels. When this driving force becomes greater than the braking force, the vehicle wheels 32 spin and dig in the wheel loader 10. The drivetrain 11 is therefore configured to carry out the method according to the invention. By means of an environment sensor system 12 suitable for this purpose, a situation is detected in order to recognize in advance whether the braking force acting on the travel motor 31 due to the speed deceleration is lower than a driving force acting on the vehicle wheels 32 due to a moment of inertia of the travel motor 31. If this is the case, the travel motor 31 is supplied with a power opposite to its operating direction to reduce the rotational speed.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 work device
11 electric drivetrain
12 environment sensor system
20 work drive
21 work motor
22 work device
30 travel drive
31 travel motor
32 vehicle wheel
33 travel transmission
100 situation detection
101 situation detection by means of a speed monitoring of a driven axle
102 situation detection by means of a monitoring of a tire slip of the driven vehicle wheels
103 situation detection by means of monitoring of an applied steering angle
104 situation detection by means of a monitoring of a hydraulic pressure in the work drive
105 situation detection by means of an environment sensor system
106 situation detection by means of an acceleration sensor system
107 situation detection by means of a monitoring of the output speed of a travel transmission
108 situation detection by means of a monitoring of an engaged gear step of the travel transmission
109 situation detection by means of a monitoring of a differential lock
110 situation detection by means of a monitoring of the actuation of an input means for the work drive
111 situation detection by means of a position of a bucket of the work drive
112 situation detection by means of a displacement angle of a hydraulic pump of the work drive
113 situation detection by means of a monitoring of the travel motor and the work motor
200 situation detection
300 reduction of the speed of the travel motor
301 power supply to the travel motor for speed reduction
302 gear downshifting for supporting the speed reduction of the travel motor

The invention claimed is:

1. A method for operating an electric drivetrain of a working machine,
wherein the electric drivetrain comprises a work drive with an electric work motor and a travel drive with an electric travel motor and vehicle wheels, the electric work motor and the electric travel motor being electrically connected to a battery,
wherein the working machine experiences a speed deceleration from the outside, and
wherein a braking force acting on the vehicle wheels due to the speed deceleration can be lower than a driving force acting on the vehicle wheels due to a moment of inertia of the electric travel motor, the method comprising:
supplying the electric travel motor with electrical power from the battery, the supplied electrical power being in a direction opposite to an operating direction of the electric travel motor in order to reduce a rotational speed of the electric travel motor, based on a detection in advance using a situation detection that the braking force acting on the vehicle wheels as a result of the speed deceleration is lower than the driving force acting on the vehicle wheels.

2. The method according to claim 1, wherein the situation detection is carried out using an environment sensor system.

3. The method according to claim 1, wherein the situation detection is carried out by means of an acceleration sensor system and/or a tilt sensor system.

4. The method according to claim 1, wherein the situation detection is carried out using a slipping clutch, wherein a clutch pressure is specified in such a way that a maximum torque transmissible by the clutch is lower than a braking torque resulting from the braking force.

5. The method according to claim 1, wherein the situation detection is carried out using speed monitoring and/or torque monitoring of the travel drive.

6. The method according claim 1, wherein the situation detection is carried out using absolute speed monitoring.

7. The method according to claim 1, wherein the situation detection is carried out by monitoring a power demand of the travel drive.

8. The method according to claim 1, wherein the situation detection is carried out by of monitoring a behavior of the work drive.

9. The method according to claim 1, wherein the situation detection is carried out by monitoring a driving behavior of an operator of the working machine, and further comprising learning in advance a typical driving behavior of the operator in preparing for an event of an imminent speed deceleration.

10. The method according to claim 1, further comprising assisting a speed reduction of the electric travel motor by a gear downshift.

11. The method according to claim 1, wherein supplying the electric travel motor with the electrical power comprises supplying the electric travel motor with an electrical current that powers the electric travel motor in a direction opposite a rotation direction of the electric travel motor during the speed deceleration of the work machine.

12. The method according to claim 1, wherein the electric drivetrain comprises an inverter and wherein the inverter is configured to directly control the electric travel motor by providing the electrical power supplied by the battery to the electric travel motor.

13. An electric drivetrain for a working machine, comprising: a work drive with an electric work motor;
a travel drive with an electric travel motor and vehicle wheels; and
a battery electrically connected to the electric work motor and the electric travel motor,
wherein the vehicle wheels are rigidly drivably coupled or rigidly drivably couplable to the electric travel motor, so that in the event of a speed deceleration acting on the working machine from the outside that results in a braking force acting on the vehicle wheels the electric drivetrain is configured to detect in advance by a situation detection whether the braking force acting on the vehicle wheels due to the speed deceleration is lower than a driving force acting on the vehicle wheels due to a moment of inertia of the electric travel motor, and
wherein the travel drive is configured to supply electrical power from the battery, the electrical power being supplied to the electric travel motor in a direction opposite to an operating direction of the electric travel
motor to reduce the rotational speed when the situation
detection detects that the braking force is lower than the
driving force.

14. A working machine comprising the electric drivetrain
according to claim 11.

15. A working machine according to claim 14, wherein
the working machine is configured as a wheel loader.

16. A method for operating an electric drivetrain for a
working machine, the electric drivetrain having a work drive
with an electric work motor and a travel drive with an
electric travel motor and vehicle wheels, wherein the vehicle
wheels are rigidly drivably coupled or rigidly drivably
couplable to the electric travel motor, the method compris-
ing:

detecting in advance of a speed deceleration acting on the
    working machine from the outside, by a situation
    detection, whether a braking force acting on the vehicle
    wheels due to the speed deceleration is lower than a
    driving force acting on the vehicle wheels due to a
    moment of inertia of the electric travel motor, and
  based on the situation detection detecting that the braking
    force is lower than the driving force, supplying from a
    battery of the travel drive, electrical power to the
    electric travel motor in a direction opposite to an
    operating direction of the electric travel motor to
    reduce a rotational speed of the electric travel motor.

\* \* \* \* \*